(12) United States Patent
Huesemann et al.

(10) Patent No.: US 11,548,104 B2
(45) Date of Patent: Jan. 10, 2023

(54) CHECK PIN INSERTION AND REMOVAL APPARATUS AND ITS METHOD OF USE

(71) Applicant: The Boeing Company, Chicago, IL (US)

(72) Inventors: Nicholas Scott Huesemann, Webster Groves, MO (US); Trevor A. Hartnagel, Highland, IL (US)

(73) Assignee: The Boeing Company, Chicago, IL (US)

( * ) Notice: Subject to any disclaimer, the term of this patent is extended or adjusted under 35 U.S.C. 154(b) by 410 days.

(21) Appl. No.: 16/736,395

(22) Filed: Jan. 7, 2020

(65) Prior Publication Data
US 2021/0205938 A1  Jul. 8, 2021

(51) Int. Cl.
*B23P 19/027* (2006.01)
*G01B 5/12* (2006.01)
*G01B 5/00* (2006.01)

(52) U.S. Cl.
CPC .......... *B23P 19/027* (2013.01); *G01B 5/0004* (2013.01); *G01B 5/12* (2013.01)

(58) Field of Classification Search
CPC . B21J 152/44; B21J 15/44; B64C 1/12; B64F 5/10; B64F 5/60; B64F 5/00; Y10T 29/49895; Y10T 29/53852; B23P 19/06; B23P 19/027; B25B 11/02
See application file for complete search history.

(56) References Cited

U.S. PATENT DOCUMENTS

| | | | | |
|---|---|---|---|---|
| 1,375,395 A * | 4/1921 | Krook | ...... | B21J 15/10 72/450 |
| 1,876,021 A * | 9/1932 | Quigley | ...... | B21J 15/44 411/453 |
| 1,903,548 A | 4/1933 | Kreis | | |
| 2,314,582 A * | 3/1943 | Gerich | ...... | B21J 15/44 33/645 |
| 2,877,543 A * | 3/1959 | Myers | ...... | B25B 27/28 29/898.055 |
| 3,218,701 A * | 11/1965 | Downes | ...... | B21J 15/38 29/509 |
| 3,703,762 A * | 11/1972 | Lind | ...... | E04G 17/14 228/139 |
| 3,878,595 A * | 4/1975 | Boyle | ...... | B21J 15/10 29/715 |
| 4,077,102 A * | 3/1978 | Smith | ...... | B23P 19/025 29/252 |

(Continued)

FOREIGN PATENT DOCUMENTS

EP         917920 A2 *  5/1999  ............. B21J 15/10

*Primary Examiner* — Jason L Vaughan
(74) *Attorney, Agent, or Firm* — Quinn IP Law (57) ABSTRACT

An apparatus is selectively controlled to insert a check pin into a fastener hole in a workpiece surface and remove the check pin from the fastener hole. The apparatus is a pneumatically actuated apparatus having a pair of press actuators that are selectively operated to press the check pin attached to a check pin holder of the apparatus into a fastener hole in a workpiece, and a pair of remove actuators that are selectively operated to push against the workpiece surface and move the apparatus away from the workpiece surface to remove the check pin attached to the check pin holder from the fastener hole in the workpiece.

21 Claims, 4 Drawing Sheets

(56) References Cited

U.S. PATENT DOCUMENTS

| | | | | |
|---|---|---|---|---|
| 4,283,826 A | * | 8/1981 | Miller | B23P 19/025 |
| | | | | 294/94 |
| 4,355,450 A | * | 10/1982 | Miller | B23P 19/025 |
| | | | | 29/890.031 |
| 5,417,294 A | | 5/1995 | Suher | |
| 6,172,374 B1 | * | 1/2001 | Banks | B21J 15/10 |
| | | | | 250/559.3 |
| 6,463,643 B1 | * | 10/2002 | Behling | B29C 48/507 |
| | | | | 29/263 |
| 6,763,566 B1 | * | 7/2004 | Hassler | B02C 13/16 |
| | | | | 254/133 R |
| 10,981,277 B2 | * | 4/2021 | Pringle, IV | B23P 19/063 |
| 10,987,767 B2 | * | 4/2021 | Pringle, IV | F16B 1/0057 |
| 10,995,782 B2 | * | 5/2021 | Bouriquet | B64F 5/10 |
| 11,267,586 B2 | * | 3/2022 | Yamane | B25B 11/02 |

* cited by examiner

CHECK PIN INSERTION AND REMOVAL APPARATUS AND ITS METHOD OF USE

FIELD

This disclosure pertains to an apparatus that selectively inserts a check pin into a fastener hole in a workpiece surface and removes the check pin from the fastener hole. More specifically, this disclosure pertains to a pneumatically actuated apparatus having a pair of press actuators that are selectively operated to press a check pin attached to a check pin holder of the apparatus into a tapered fastener hole in a workpiece surface, and a pair of remove actuators that are selectively operated to push against the workpiece surface and move the apparatus away from the workpiece surface to remove the check pin attached to the check pin holder from the fastener hole in the workpiece surface.

BACKGROUND

The use of tapered fasteners in tapered holes in the construction of aircraft components provides increased surface contact between the exterior surface of the tapered fastener and the interior surface of the tapered hole, and thereby provides increased structural joint fatigue life in highly stressed and fatigue critical structural members of an aircraft.

In the construction of aircraft, tapered holes are often employed in securing together component parts of the aircraft, for example structural panels of the aircraft. Tapered holes would be drilled through the structural panels being secured together forming fastener holes in the panels with tapered interior surfaces. When a tapered fastener is inserted into a correctly tapered hole with there being an optimized surface engagement between the exterior surface of the tapered fastener and the interior surface of the tapered hole, the fit between the exterior tapered surface of the fastener and the interior tapered surface of the hole reduces stress in the connection between the aircraft components and improves fatigue life of the connection.

To test for the optimum surface engagement between an exterior surface of a tapered fastener and an interior surface of a tapered hole, a process often referred to as blue-pinning is used.

The blue-pinning process employs a tapered check pin that is used to inspect the bearing surface of a tapered hole drilled between two or more aircraft components to be secured together by a tapered fastener. The check pin has a blue dye applied to its tapered interior surface. The check pin is then hammered into the tapered hole in the workpiece, typically by using a manual slide hammer. After sufficient interference fit between the tapered hole and the tapered check pin has been achieved, the check pin is then hammered out of the hole. The check pin is then inspected for a lighter shade of blue on the tapered exterior surface of the check pin that indicates areas of contact between the check pin tapered exterior surface and the tapered hole. The inspection of the tapered exterior surface of the check pin provides an indication of the amount of bearing surface contact that will incur when a tapered fastener of the same configuration as the check pin is inserted into the tapered hole through the aircraft components being secured together by the tapered fastener.

Operators perform the blue-pinning process in each tapered fastener hole in a workpiece surface in order to test each tapered hole in the workpiece surface for high fatigue life. This could require testing thousands of holes. As a result of the repeated hammer motion for each blue-pinning process over thousands of holes per shipset, operator injury and strain is rising.

SUMMARY

The check pin insertion and removal apparatus of this disclosure and its method of use reduces the large ergonomic risk to operators inspecting tapered holes in a workpiece surface. The apparatus of this disclosure is a pneumatically operated apparatus that eliminates the need for the manual operation of hammering to insert or remove a tapered check pin from holes in a workpiece surface.

The check pin insertion and removal apparatus is basically comprised of a first press actuator and a second press actuator, a check pin holder, and a first remove actuator and a second remove actuator. The apparatus also includes a base. The first press actuator is secured to the base, the second press actuator is secured to the base, the first remove actuator is secured to the base and the second remove actuator is secured to the base. The first press actuator, the second press actuator, the first remove actuator and the second remove actuator are all secured to the base in parallel orientations.

A hammer rod is secured to the base. The hammer rod has a straight length that extends from the base to a hammer head at a distal end of the hammer rod. The hammer head has a check pin holder in a distal end surface of the hammer head. The check pin holder is operable to removably attach a check pin on the check pin holder.

A sliding hammer is mounted on the hammer rod for a reciprocating, sliding movement of the sliding hammer along the length of the hammer rod. The sliding hammer when moving along the length of the hammer rod toward the distal end of the hammer rod will impact with the hammer head on the distal end of the hammer rod and exert an impacting force on a check pin held by the check pin holder of the hammer head and drive the check pin into a tapered hole in a workpiece surface.

A yoke is connected to the distal end of the first press rod and to the distal end of the second press rod. A center hole extends through the yoke. The sliding hammer extends through the center hole through the yoke and is thereby mounted on the yoke for reciprocating movements through the center hole.

The first press actuator has a first press housing with a first press rod extending from inside the first press housing to a distal end of the first press rod outside of the first press housing. The first press rod is moveable linearly between an extended position of the first press rod relative to the first press housing and a retracted position of the first press rod relative to the first press housing.

The second press actuator has a second press housing with a second press rod extending from inside the second press housing to a distal end of the second press rod outside the second press housing. The second press rod is movable linearly between an extended position of the second press rod relative to the second press housing and a retracted position of the second press rod relative to the second press housing.

The movement of the first press rod to the extended position of the first press rod relative to the first press housing and the movement of the second press rod to the extended position of the second press rod relative to the second press housing moves the yoke over the hammer rod toward the hammer head and moves the sliding hammer over the hammer rod toward the hammer head. The sliding hammer moves over the hammer rod until the sliding hammer impacts with the hammer head, and thereby moves a check pin held by the check pin holder into a hole in a workpiece surface.

The first press actuator and the second press actuator are both operable together to selectively move the first press rod to the extended position of the first press rod relative to the first press housing and move the second press rod to the extended position of the second press rod relative to the second press housing The first press actuator and the second press actuator are also both operable together to selectively move the first press rod to the retracted position of the first press rod relative to the first press housing and move the second press rod to the retracted position of the second press rod relative to the second press housing.

The movement of the first press rod to the retracted position of the first press rod relative to the first press housing and the movement of the second press rod to the retracted position of the second press rod relative to the second press housing moves the yoke and the sliding hammer along the hammer rod and away from the hammer head.

The first remove actuator has a first remove housing with a first remove rod extending from inside the first remove housing to a distal end of the first remove rod outside the first remove housing. A first remove pad is connected to the distal end of the first remove rod. The first remove rod is moveable linearly between an extended position of the first remove rod relative to the first remove housing and a retracted position of the first remove rod relative to the first remove housing.

The second remove actuator has a second remove housing with a second remove rod extending from inside the second remove housing to a distal end of the second remove rod outside the second remove housing. A second remove pad is connected to the distal end of the second remove rod. The second remove rod is moveable linearly between an extended position of the second remove rod relative to the second remove housing and a retracted position of the second remove rod relative to the second remove housing.

The first remove actuator and the second remove actuator are both operable together to selectively move the first remove rod to the extended position of the first remove rod relative to the first remove housing and move the second remove rod to the extended position of the second remove rod relative to the second remove housing. The movement of the first remove rod from the first remove housing moves the first remove pad into engagement with the workpiece surface and pushes against the workpiece surface to move the first remove housing away from the workpiece surface. The movement of the second remove rod from the second remove housing moves the second remove pad into engagement with the workpiece surface and pushes against the workpiece surface to move the second remove housing away from the workpiece surface. These movements of the first remove rod and the second remove rod move the first remove housing and the second remove housing away from the workpiece surface and remove the check pin held by the check pin holder from the hole in the workpiece surface.

In this disclosure, the first press actuator, the second press actuator, the first remove actuator and the second remove actuator are all linear actuators and are all pneumatic actuators. However, these are only examples of the types of actuators that could be used in the apparatus. It is not necessary that they be pneumatic actuators. Any other equivalent type of actuator, for example hydraulic actuators, screw and nut actuators, ball nut actuators, or any other equivalent type of actuator could be used as the actuators of the apparatus.

With each of the actuators being pneumatic actuators, the first press housing of the first press actuator is a cylindrical housing. A first press piston is received inside the first press housing for reciprocating movements of the first press piston through the first press housing. The first press rod has a proximal end connected to the first press piston and the first press rod extends from the proximal end of the first press rod connected to the first press piston to the distal end of the first press rod outside the first press housing.

The second press housing of the second press actuator is a cylindrical housing. A second press piston is received inside the second press housing for reciprocating movements of the second press piston through the second press housing. The second press rod has a proximal end connected to the second press piston and the second press rod extends from the proximal end of the second press rod connected to the second press piston to the distal end of the second press rod outside the second press housing.

The first remove housing of the first remove actuator is a cylindrical housing. A first remove piston is received inside the first remove housing for reciprocating movements of the first remove piston through the first remove housing. The first remove rod has a proximal end connected to the first remove piston and the first remove rod extends from the proximal end of the first remove rod connected to the first remove piston to the distal end of the first remove rod outside the first remove housing.

The second remove housing of the second remove actuator is a cylindrical housing. A second remove piston is received inside the second remove housing for reciprocating movements of the second remove piston through the second remove housing. The second remove rod has a proximal end connected to the second remove piston and the second remove rod extends from the proximal end of the second remove rod connected to the second remove piston to the distal end of the second remove rod outside the second remove housing.

The operation of each of the first press actuator, the second press actuator, the first remove actuator and the second remove actuator is controlled by controls that could be any type of known controls, for example computer controls, manual controls, or other equivalent types of controls. In this disclosure, the controls are manual controls and more specifically, pneumatic controls.

The features, functions, and advantages that have been discussed can be achieved independently in various embodiments or may be combined in yet other embodiments, further details of which can be seen with reference to the following description and drawings.

DETAILED DESCRIPTION

The check pin insertion and removal apparatus 10 of this disclosure is constructed of several actuators and other component parts that are all supported on a common base 12. The actuators, component parts and base 12 are constructed of materials that provide the apparatus 10 with sufficient strength that enables the apparatus to perform its method of use. The materials employed in constructing the apparatus actuators, component parts and base 12 could be metals, composite materials, or other equivalent types of materials.

Figure 1:
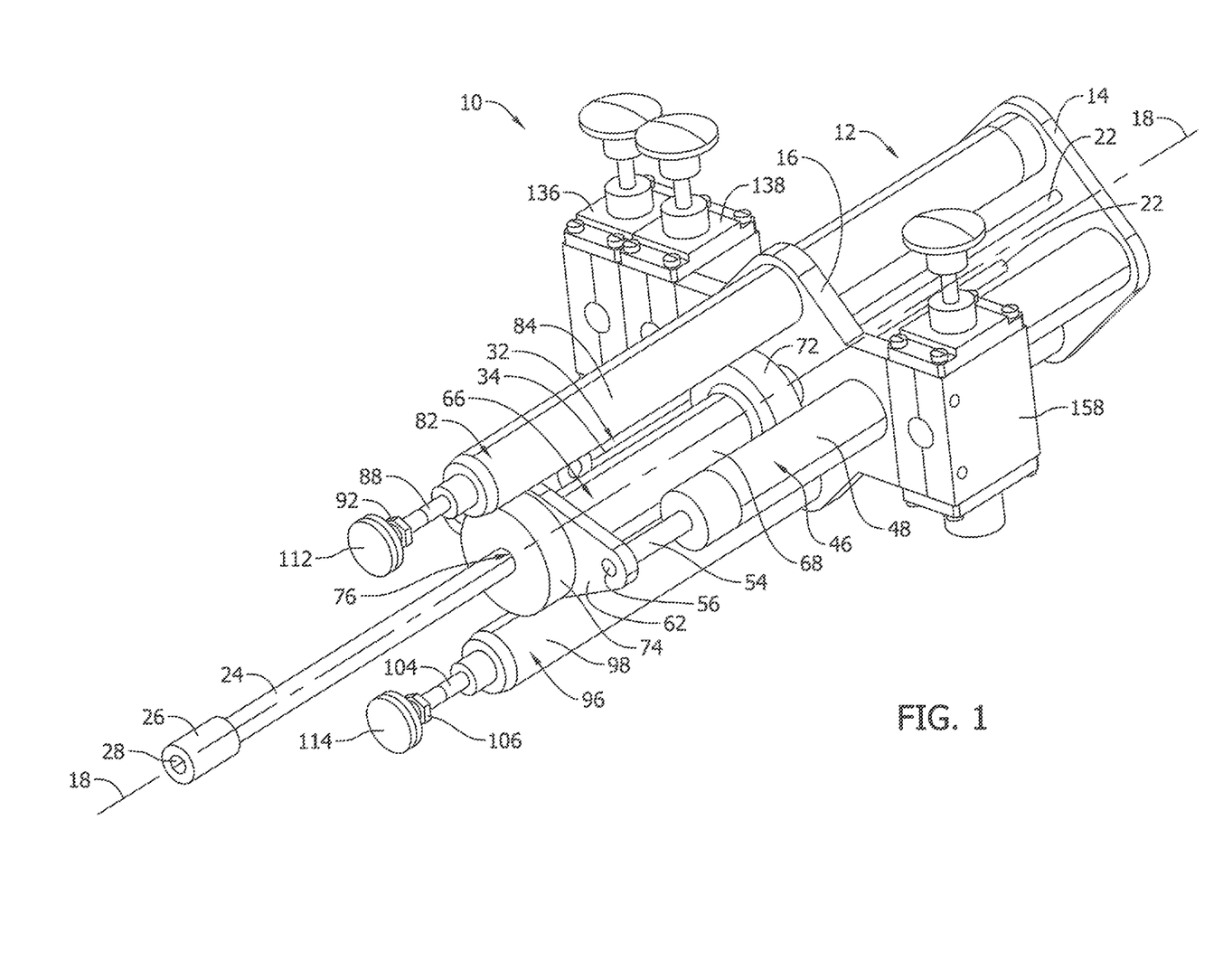
FIG. 1 is a perspective view of the apparatus with each of the actuators of the apparatus in their retracted conditions.
Figure 2:
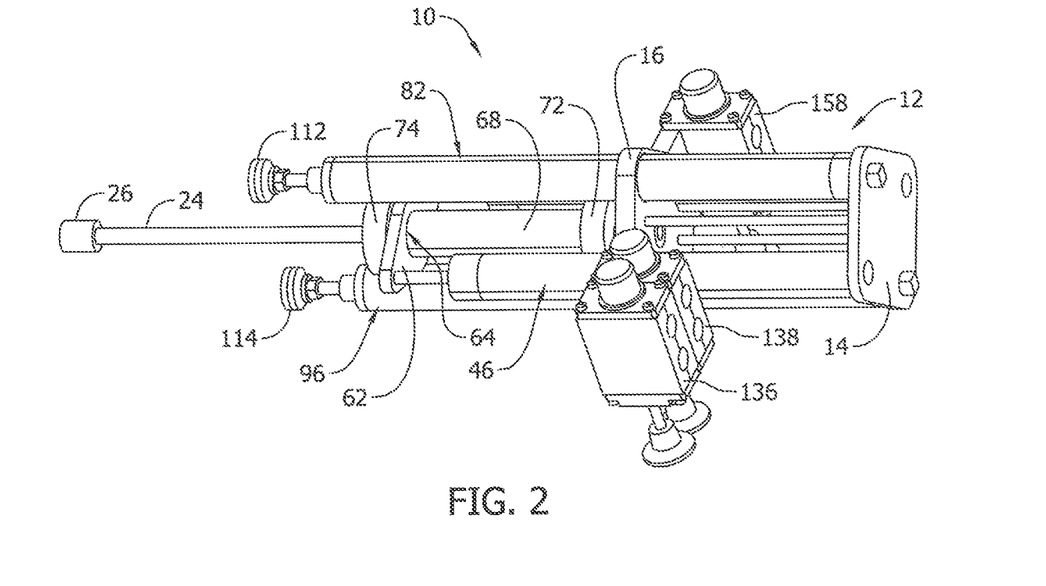
FIG. 2 is a perspective view of the apparatus similar to that of FIG. 1, but showing the opposite side of the apparatus from that shown in FIG. 1.

The base 12 is comprised of a proximal plate 14 and a distal plate 16. The proximal plate 14 and distal plate 16 are parallel to each other. The proximal plate 14 and distal plate 16 have center points that are intersected by an axis 18 represented in FIG. 1 that defines a center axis of the apparatus 10. The axis 18 also defines mutually perpendicular axial and radial directions relative to the apparatus 10. A plurality of connecting rods 22 extend between and are connected between the proximal plate 14 and the distal plate 16. The proximal plate 14, the distal plate 16 and the plurality of connecting rods 22 are connected together as an integral unit.

A hammer rod 24 is connected to the distal plate 16. The hammer rod 24 has a straight length that extends from the distal plate 16 to a hammer head 26 at a distal end of the hammer rod 24. The hammer head 26 has a check pin holder 28 in a distal end surface of the hammer head 26. The check pin holder 28 is represented schematically in FIG. 1. The check pin holder 28 is operable to removably attach a check pin on the check pin holder 28 with a center axis of the check pin positioned coaxial with the axis 18 of the apparatus 10.

One of the actuators of the apparatus 10 is a first press actuator 32. The first press actuator 32 has a first press housing 34. The first press housing 34 is a cylindrical housing having an axial length that is parallel to the axis 18 of the apparatus 10. The cylindrical first press housing 34 has a hollow, cylindrical interior volume. A first press piston 36 is received inside the interior volume of the first press housing 34 for reciprocating movements of the first press piston 36 through the first press housing 34. The first press piston 36 and the first press housing 34 are represented schematically in FIG. 7. A first press rod 38 extends from inside the first press housing 34 to a distal end 42 of the first press rod outside the first press housing. The first press rod 38 has a proximal end 44 connected to the first press piston 36. The first press rod 38 extends from the proximal end 44 of the first press rod connected to the first press piston 36 to the distal end 42 of the first press rod 38 outside the first press housing 34. In response to reciprocating movements of the first press piston 36 in the first press housing 34, the first press rod 38 is moved linearly and axially along a first press axis between an extended position of the first press rod 38 relative to the first press housing 34 represented in FIG. 5 and a retracted position of the first press rod 38 relative to the first press housing 34 represented in FIGS. 1-4 and 6.

One of the actuators of the apparatus 10 is a second press actuator 46. The second press actuator 46 has a second press housing 48. The second press housing 48 is a cylindrical housing having an axial length that is parallel to the axis 18 of the apparatus 10. The cylindrical second press housing 48 has a hollow, cylindrical interior volume. A second press piston 52 is received inside the interior volume of the second press housing 48 for reciprocating movements of the second press piston 52 through the second press housing 48. The second press piston 52 and the second press housing 48 are represented schematically in FIG. 7. A second press rod 54 extends from inside the second press housing 48 to a distal end 56 of the second press rod outside the second press housing. The second press rod 54 has a proximal end 58 connected to the second press piston 52. The second press rod 54 extends from the proximal end 58 of the second press rod connected to the second press piston 52 to the distal end 56 of the second press rod 54 outside the second press housing 48. In response to reciprocating movements of the second press piston 52 in the second press housing 48, the second press rod 54 is moved linearly and axially along a second press axis between an extended position of the second press rod 54 relative to the second press housing 48 represented in FIG. 5 and a retracted position of the second press rod 54 relative to the second press housing 48 represented in FIGS. 1-4 and 6.

A yoke 62 is connected to the distal end 42 of the first press rod 38 and the distal end 56 of the second press rod 54. The yoke 62 has the general configuration of an oblong plate that is parallel to the proximal plate 14 and the distal plate 16. A center hole 64 extends through the yoke 62 and is coaxial with the center axis 18 of the apparatus 10. The center hole 64 of the yoke 62 is also concentric and coaxial with the hammer rod 24.

A sliding hammer 66 is mounted on the hammer rod 24 for a reciprocating, sliding movement along the length of the hammer rod 24. The sliding hammer 66 has a cylindrical body 68 with a cylindrical, proximal hammer weight 72 secured to the proximal end of the cylindrical body 68 and a cylindrical, distal hammer weight 74 secured to the distal end of the cylindrical body 68. The cylindrical body 68 of the sliding hammer 66 extends through the center hole 64 of the yoke 62 mounting the sliding hammer 66 for reciprocating, sliding movement through the yoke 62. A center bore 76 extends completely through the proximal hammer weight 72, the cylindrical body 68 and the distal hammer weight 74 of the sliding hammer 66. The hammer rod 24 extends through the center bore 76, mounting the sliding hammer 66 on the hammer rod 24 for sliding, reciprocating movements over the hammer rod 24.

Figure 3:
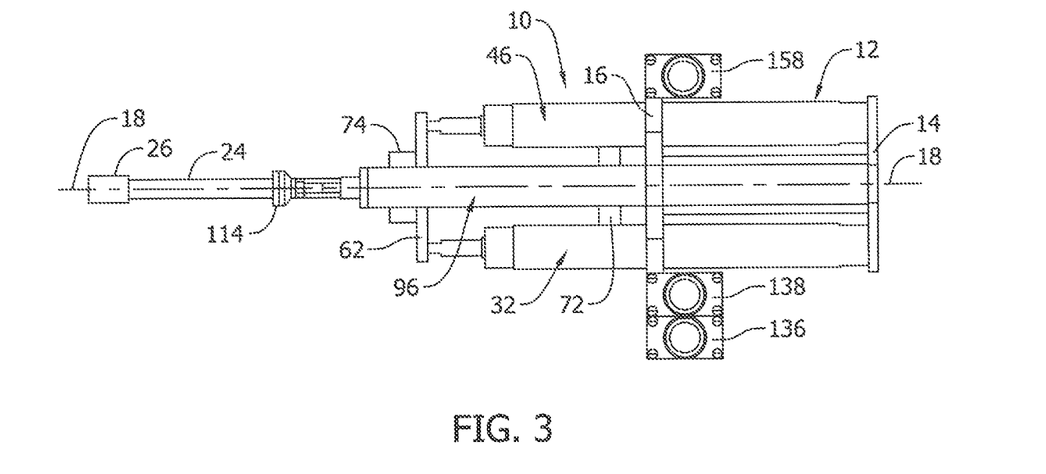
FIG. 3 is a plan view of the apparatus of FIG. 1.

The first press actuator 32 and the second press actuator 46 are positioned on radially opposite sides of the center axis 18 and are positioned in a single, press plane represented by the plan view of the apparatus 10 in FIG. 3. The first press actuator 32, the second press actuator 46 and the center axis 18 are all positioned in the press plane.

Figure 5:
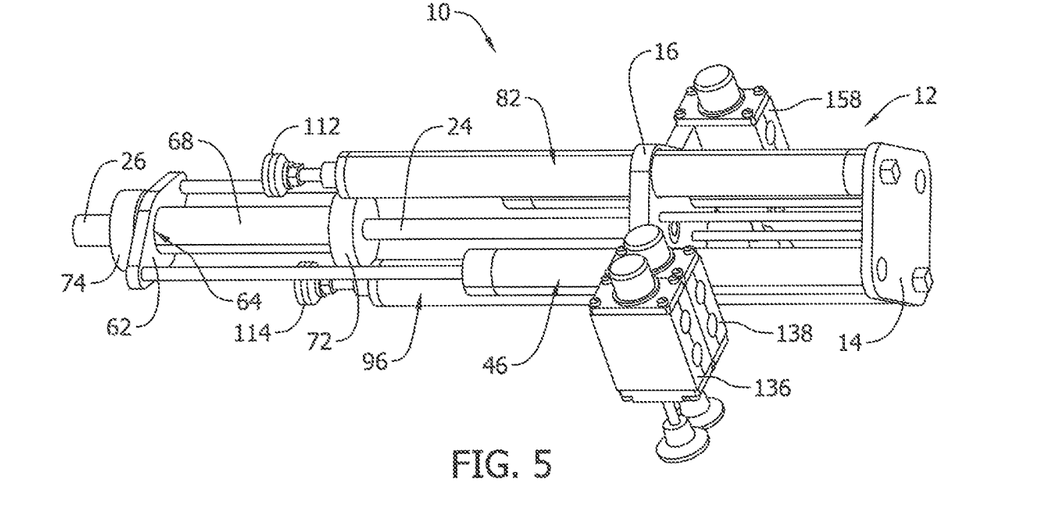
FIG. 5 is a perspective view similar to that of FIG. 2, but showing the remove actuator of the apparatus in their retracted conditions and showing the press actuators of the apparatus in their extended conditions.
Figure 6:
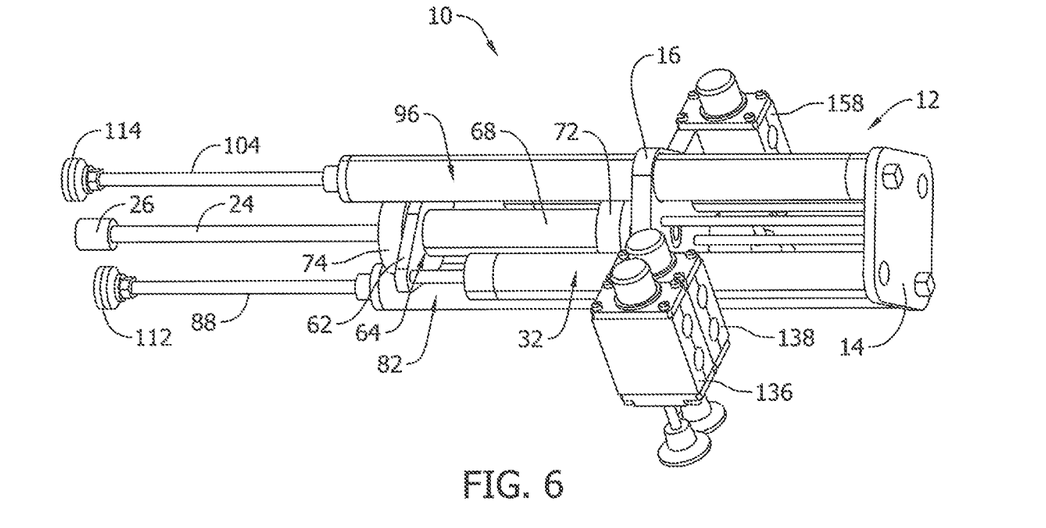
FIG. 6 is a perspective view of the apparatus similar to that of FIG. 2, but showing the press actuators of the apparatus in their retracted conditions and showing the remove actuators of the apparatus in their extended conditions.

The first press actuator 32 and the second press actuator 46 are both operable together to selectively move the first press rod 38 to the extended position of the first press rod 38 relative to the first press housing 34 and move the second press rod 54 to the extended position of the second press rod 54 relative to the second press housing 48. This movement of the first press rod 38 and the second press rod 54 moves the yoke 62 toward the hammer head 26 and moves the sliding hammer 66 on the yoke 64 into contact with the hammer head 26. With a check pin held by the check pin holder 28 of the hammer head 26, and with the check pin positioned in a hole in a workpiece surface, the movement of the first press rod 38 and the second press rod 54 to their extended positions causes the sliding hammer 66 to exert a hammering force on the hammer head 26 that in turn drives the check pin held by the check pin holder 28 into the hole in a workpiece surface. The extended positions of the first press rod 38 and the second press rod 54 relative to the first press housing 34 and the second press housing 48, respectively, is represented in FIG. 5. Accordingly, the first press actuator 32 and the second press actuator 46 each having a press rod 38, 54 with a distal end coupled to a yoke 62 configured to engage the check pin holder 28, each of the first press actuator 32 and the second press actuator 46 being operable to selectively extend the press rods 38, 54 and move the yoke 62 to engage and exert a force against the check pin holder 28 to press the check pin into a tapered hole in a workpiece surface.

The apparatus 10 also includes a first remove actuator 82. The first remove actuator 82 has a first remove housing 84. The first remove housing 84 is a cylindrical housing having an axial length that is parallel to the axis 18 of the apparatus 10. The cylindrical first remove housing 84 has a hollow, cylindrical interior volume. A first remove piston 86 is received inside the interior volume of the first remove housing 84 for reciprocating movements of the first remove piston 86 through the first remove housing 84. The first remove piston 86 and the first remove housing 84 are represented schematically in FIG. 7. A first remove rod 88 extends from inside the first remove housing 84 to a distal end 92 of the first remove rod outside the first remove housing. The first remove rod 88 has a proximal end 94 connected to the first remove piston 86. The first remove rod 88 extends from the proximal end 94 of the first remove rod connected to the first remove piston 86 to the distal end 92 of the first remove rod 88 outside the first remove housing 84. In response to reciprocating movements of the first remove piston 86 in the first remove housing 84, the first remove rod 88 is moved linearly and axially along a first remove axis between an extended position of the first remove rod 88 relative to the first remove housing 84 represented in FIG. 6 and a retracted position of the first remove rod 88 relative to the first remove housing 84 represented in FIGS. 1-5.

The apparatus 10 also includes a second remove actuator 96. The second remove actuator 96 has a second remove housing 98. The second remove housing 98 is a cylindrical housing having an axial length that is parallel to the axis 18 of the apparatus 10. The cylindrical second remove housing 98 has a hollow, cylindrical interior volume. A second remove piston 102 is received inside the interior volume of the second remove housing 98 for reciprocating movements of the second remove piston 102 through the second remove housing 98. The second remove piston 102 and the second remove housing 98 are represented schematically in FIG. 7. A second remove rod 104 extends from inside the second remove housing 98 to a distal end 106 of the second remove rod 104 outside the second remove housing 98. The second remove rod 104 has a proximal end 108 connected to the second remove piston 102. The second remove rod 104 extends from the proximal end 108 of the second remove rod 104 connected to the second remove piston 102 to the distal end 106 of the second remove rod 104 outside the second remove housing 98. In response to reciprocating movements of the second remove piston 102 in the second remove housing 98, the second remove rod 104 is moved linearly and axially along a second remove axis between an extended position of the second remove rod 104 relative to the second remove housing 98 represented in FIG. 6 and a retracted position of the second remove rod 104 relative to the second remove housing 98 represented in FIGS. 1-5.

A first remove pad 112 is connected to the distal end 92 of the first remove rod 88. The first remove pad 112 is connected to the distal end 92 of the first remove rod 88 by a swivel connection, for example a ball and socket connection or other equivalent type of connection. A second remove pad 114 is connected to the distal end 106 of the second remove rod 104. The second remove pad 114 is connected to the distal end 106 of the second remove rod 104 by a swivel connection, for example a ball and socket connection or other equivalent type of connection.

The first remove actuator 82 and the second remove actuator 96 are both operable together to selectively move the first remove rod 88 to the extended position of the first remove rod 88 relative to the first remove housing 84 and move the second remove rod 104 to the extended position of the second remove rod 104 relative to the second remove housing 98. The movement of the first remove rod 88 to the extended position of the first remove rod 88 from the first remove housing 84 moves the first remove pad 112 into engagement with the workpiece surface and pushes against the workpiece surface to move the first remove housing 84 away from the workpiece surface. The movement of the second remove rod 104 to the extended position of the second remove rod 104 from the second remove housing 98 moves the second remove pad 114 into engagement with the workpiece surface and pushes against the workpiece surface to move the second remove housing 98 away from the workpiece surface. With the first press rod 38 and the second press rod 54 in their retracted positions relative to the first press housing 34 and second press housing 48, respectively, these movements of the first remove rod 88 and the second remove rod 104 move the first remove housing 84, the second remove housing 98, the base 12, the hammer head 26 and the check pin holder 28 away from the workpiece surface and remove the check pin held by the check pin holder 28 from the hole in the workpiece surface. Accordingly, the first remove actuator 82 and the second remove actuator 96 secured on the base 12 each have removal rods 88, 104 with a removal pad 112, 114, and are operable to selectively extend to move the remove pads 112, 114 to engage and push against the workpiece surface, to move the base 12 and first and second remove actuators 82, 96 away from the workpiece surface so as to cause the removal of the check pin from the tapered hole.

Figure 4:
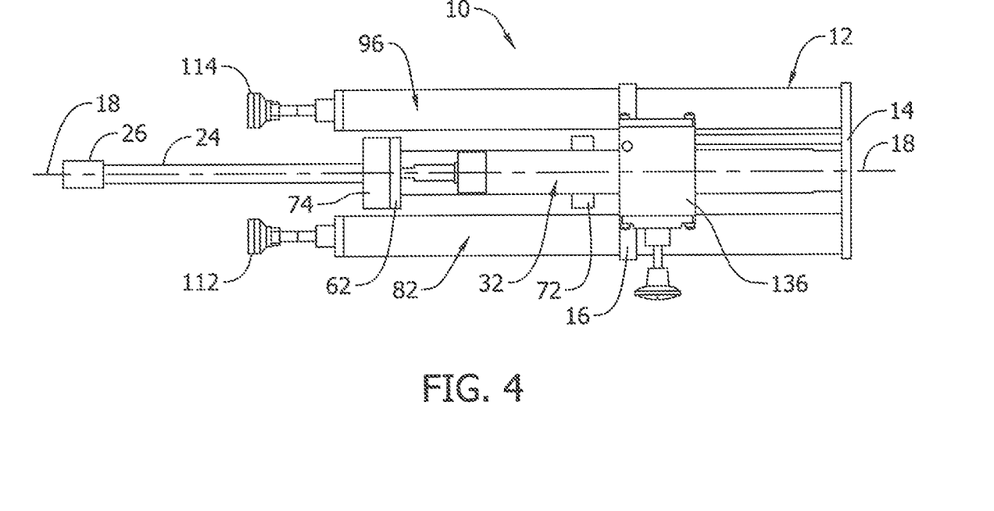
FIG. 4 is a plan view of the apparatus of FIG. 3, rotated 90°.

The first remove actuator 82 and the second remove actuator 96 are positioned on radially opposite sides of the center axis 18 and are positioned in a single, remove plane represented by the plan view of the apparatus 10 in FIG. 4. The first remove actuator 82, the second remove actuator 96 and the center axis 18 are all positioned in the remove plane. The press plane and the remove plane intersect and are perpendicular planes.

The first press actuator 32, the second press actuator 46, the first remove actuator 82 and the second remove actuator 96 are all secured to the base 12. The first press actuator 32, the second press actuator 46, the first remove actuator 82 and the second remove actuator 96 are all positioned relative to the base 12 in parallel orientations around the center axis 18. The base 12 positions the first press actuator 32 and the second press actuator 46 in the press plane, and positions the first remove actuator 82 and the second remove actuator 96 in the remove plane. The press plane and the remove plane intersect and are perpendicular. The base 12 can be manually moved to position the apparatus 10 relative to a workpiece. The base 12 could also be attached to and moved by a mechanical device such as an end effector, a robot, a crane structure or another equivalent mechanical device.

The first press actuator 32, the second press actuator 46, the first remove actuator 82 and the second remove actuator 96 are all linear actuators and are all pneumatic actuators. However, these are only examples of the type of actuators that could be used in the apparatus 10. It is not necessary that they be pneumatic actuators. Any other equivalent type of actuator, for example, hydraulic actuators, screw and nut actuators, ball nut actuators, or any other equivalent type of actuator could be used as the actuators of the apparatus 10.

Figure 7:
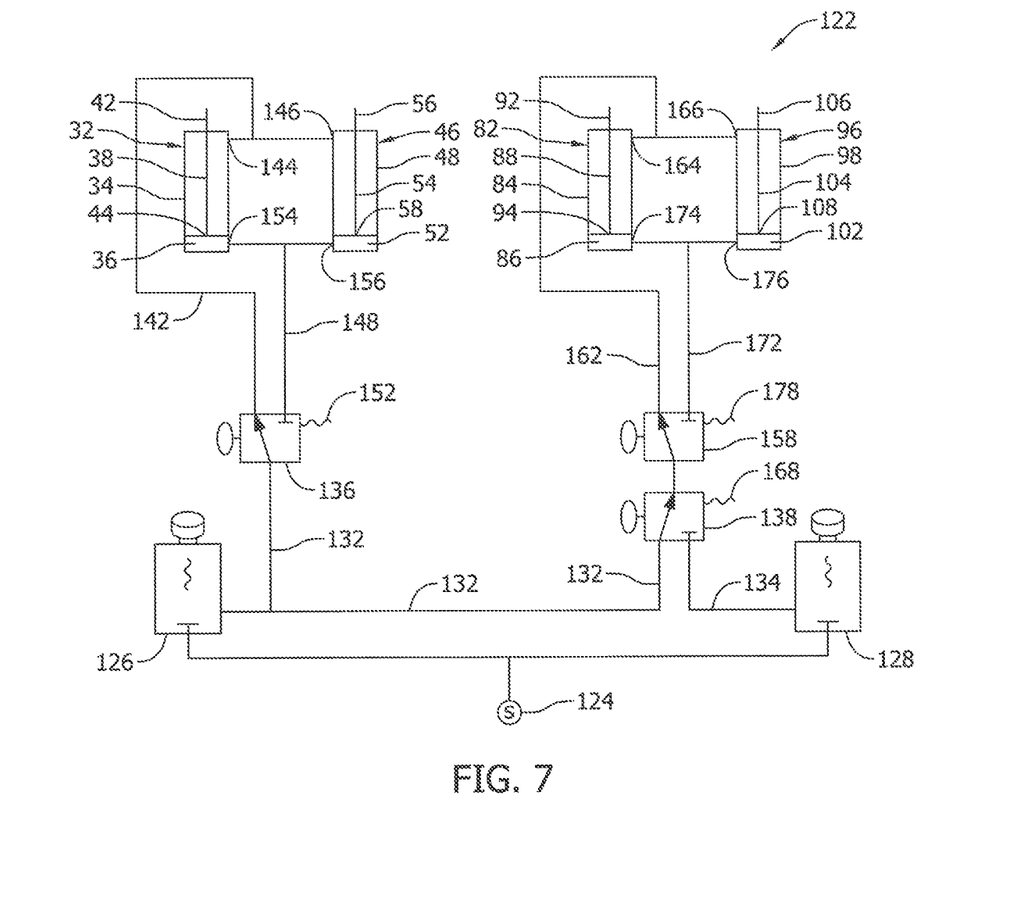
FIG. 7 is a schematic representation of the pneumatic control system of the apparatus.

FIG. 7 is a schematic representation of the pneumatic pressure control circuit 122 of the apparatus 10. The control circuit 122 could be an automated control circuit, a manual control circuit, or some other equivalent control circuit. The control circuit 122 includes a source of pneumatic pressure 124. The source of pneumatic pressure 124 communicates with a high pressure regulator 126 and a low pressure regulator 128. The high pressure regulator 126 supplies pneumatic fluid at a high pressure to a high pressure feed line 132 of the control circuit 122. The low pressure regulator 128 supplies pneumatic fluid at a low pressure to a low pressure feed line 134 of the control circuit 122. The high pressure feed line 132 supplies pneumatic fluid at a high pressure to a hammer control valve 136 and to an eject pressure valve 138. The low pressure feed line 134 also supplies pneumatic fluid at a low pressure to the eject pressure valve 138.

In the position of the hammer control valve 136 represented in FIG. 7, the hammer control valve 136 supplies high pressure pneumatic fluid to a retract line 142. The retract line 142 supplies the high pressure pneumatic fluid to a retract port 144 of the first press actuator 32 and a retract port 146 of the second press actuator 46. The high pressure pneumatic fluid supplied to the retract port 144 of the first press actuator 32 causes the first press piston 36 and the first press rod 38 to move to their retracted positions in the first press housing 34. The high pressure pneumatic fluid supplied to the retract port 146 of the second press actuator 46 causes the second press piston 52 and the second press rod 54 to move to their retracted positions in the second press housing 48.

Movement of the hammer control valve 136 to the right as represented in FIG. 7, either by manual force applied to the hammer control valve 136 or another equivalent force applied to the hammer control valve 136 results in the high pressure feed line 132 communicating with a press line 148. The movement of the hammer control valve 136 to the right is opposed by a spring 152 or other equivalent biasing device that biases the hammer control valve 136 to the left. The press line 148 communicates the high pressure pneumatic fluid with a press port 154 on the first press actuator 32 and a press port 156 on the second press actuator 46.

The high pressure pneumatic fluid supplied to the press port 154 of the first press actuator 32 causes the first press piston 36 and the first press rod 38 to move to their extended positions in the first press housing 34. The high pressure pneumatic fluid supplied to the press port 156 on the second press actuator 46 causes the second press piston 52 and the second press rod 54 to move to their extended positions in the second press housing 48. This movement of the first press rod 38 and the second press rod 54 moves the yoke 62 toward the hammer head 26 and moves the sliding hammer 66 on the yoke 64 into contact with the hammer head 26. With a check pin held by the check pin holder 28 of the hammer head 26, and with the check pin positioned in a hole in a workpiece surface, the movement of the first press rod 38 and the second press rod 54 to their extended positions causes the slide hammer 66 to exert a hammering force on the hammer head 26 that in turn drives the check pin held by the check pin holder 28 into the hole in a workpiece surface.

In the position of the eject pressure valve 138 represented in FIG. 7, the eject pressure valve 138 supplies high pressure pneumatic fluid to an eject control valve 158. In the position of the eject control valve 158 represented in FIG. 7, the eject control valve 158 supplies high pressure pneumatic fluid to a retract line 162. The retract line 162 supplies the high pressure pneumatic fluid to a retract port 164 of the first remove actuator 82 and a retract port 166 of the second remove actuator 96. The high pressure pneumatic fluid supplied to the retract port 164 of the first remove actuator 82 causes the first remove piston 86 and the first remove rod 88 to move to their retracted positions in the first remove housing 84. The high pressure pneumatic fluid supplied to the retract port 166 of the second remove actuator 96 causes the second remove piston 102 and the second remove rod 104 to move to their retracted positions in the second remove housing 98.

Movement of the eject pressure valve 138 to the right is represented in FIG. 7, either my manual force applied to the eject pressure valve 138 or another equivalent force applied to the eject pressure valve 138 results in the low pressure feed line 134 communicating with the eject control valve 158. The movement of the eject pressure valve 138 to the right is opposed by a spring 168 or other equivalent biasing device that biases the eject pressure valve 138 to the left.

With the eject pressure valve 138 moved to the right as represented in FIG. 7, movement of the eject control valve 158 to the right as represented in FIG. 7, either by manual forced applied to the eject control valve 158 or another equivalent force applied to the eject control valve 158 results in the eject pressure valve 138 communicating with a remove line 172. The remove line 172 communicates the low pressure pneumatic fluid with a remove port 174 on the first remove actuator 82 and a remove port 176 on the second remove actuator 96. The movement of the eject control valve 158 to the right is opposed by a spring 178 or other equivalent biasing device that biases the eject control valve 158 to the left. The low pressure pneumatic fluid communicated with the remove port 174 on the first remove actuator 82 and the remove port 176 on the second remove actuator 98 moves the first remove rod 88 to the extended position of the first remove rod 88 relative to the first remove housing 84 and moves the second remove rod 104 to the extended position of the second remove rod 104 relative to the second remove housing 98. The movement of the first remove rod 88 to the extended position of the first remove rod 88 from the first remove housing 84 moves the first remove pad 112 into engagement with the workpiece surface. The movement of second remove rod 104 to the extended position of the second remove rod 104 from the second remove housing 98 moves the second remove pad 114 into engagement with the workpiece surface.

With the first remove pad 112 and the second remove pad 114 in engagement with the workpiece surface, the eject control valve 158 is held in the position moved to the right as represented in FIG. 7 while the eject pressure valve 138 is released, resulting in the spring 168 moving the eject pressure valve 138 to the left as represented in FIG. 7. This causes the high pressure feed line 132 to be communicated through the eject pressure valve 138 to the eject control valve 158, with the eject control valve 158 communicating the high pressure pneumatic fluid with the remove line 172. The high pressure pneumatic fluid is communicated by the remove line 172 with the remove port 174 of the first remove actuator 82 and the remove port 176 of the second remove actuator 96. The high pressure pneumatic fluid supplied to the first remove actuator 82 and the second remove actuator 96 results in the first remove pad 112 and the second remove pad 114 engaging with the workpiece surface pushing against the workpiece surface to move the first remove housing 84 away from the workpiece surface and move the second remove housing 98 away from the workpiece surface. This results in the first remove housing 84, the second remove housing 98, the base 12, the hammer head 26 and the check pin holder 28 moving away from the workpiece surface and removing the check pin held by the check pin holder 28 from the hole in the workpiece surface. Accordingly, the check pin insertion and removal system includes a control circuit 122 operatively communicating with the first press actuator 32 and the second press actuator 46 and with the first remove actuator 82 and the second remove actuator 96, the control circuit 122 being configured for controlling operation of the first press actuator 32 and the second press actuator 46 to selectively extend the press rods 38, 54 and move the check pin held by the check pin holder 28 into a tapered hole, and for controlling operation of the first remove actuator 82 and the second remove actuator 96 to selectively extend the remove pads 112, 114 to engage and push against the workpiece surface and cause removal of the check pin from the tapered hole.

As various modifications could be made in the construction of the cap and its method of use herein described and illustrated without departing from the scope of the invention, it is intended that all matter contained in the foregoing description or shown in the accompanying drawings shall be interpreted as illustrative rather than limiting. Thus, the breadth and scope of the present disclosure should not be limited by any of the above described exemplary embodiments, but should be defined only in accordance with the following claims appended hereto and their equivalents.

The invention claimed is:

1. A check pin insertion and removal apparatus comprising:
  a press actuator, the press actuator having a press housing with a press rod extending from inside of the press housing to a distal end of the press rod outside the press housing;
  a check pin holder operatively connected to the distal end of the press rod, the check pin holder being operable to removably attach a check pin on the check pin holder;
  the press actuator being operable to selectively extend the press rod from the press housing and move a check pin held by the check pin holder into a hole in a work piece surface, and retract the press rod into the press housing;
  a remove actuator, the remove actuator having a remove housing with a remove rod extending from inside the remove housing to a distal end of the remove rod outside the remove housing; and,
  the remove actuator being operable to selectively extend the remove rod from the remove housing and move the distal end of the remove rod into operative engagement with the workpiece surface and push against the workpiece surface to move the remove housing away from the workpiece surface and remove the check pin held by the check pin holder from the hole in the workpiece surface, and retract the remove rod into the remove housing.

2. The apparatus of claim 1, further comprising:
  the press actuator being operable to selectively extend the press rod from the press housing and retract the press rod into the press housing along a press axis;
  the remove actuator being operable to selectively extend the remove rod from the remove housing and retract the remove rod into the remove housing along a remove axis; and, the press axis and the remove axis being parallel.

3. The apparatus of claim 2, further comprising:
  a base;
  the press actuator being secured to the base; the remove actuator being secured to the base;
  the press actuator being operable to extend the press rod from the press housing and relative to the base along the press axis;
  the press actuator being operable to retract the press rod into the press housing and relative to the base along the press axis;
  the remove actuator being operable to extend the remove rod from the remove housing and relative to the base along the remove axis; and,
  the remove actuator being operable to retract the remove rod into the remove housing and relative to the base along the remove axis.

4. The apparatus of claim 1, further comprising:
  the press housing being a cylindrical housing;
  a press piston inside the press housing;
  the press rod having a proximal end connected to the press piston and the press rod extending from the proximal end of the press rod connected to the press piston to the distal end of the press rod outside the press housing;
  the remove housing being a cylindrical housing; a remove piston inside the remove housing; and,
  the remove rod having a proximal end connected to the remove piston and the remove rod extending from the proximal end of the remove rod connected to the remove piston to the distal end of the remove rod outside the remove housing.

5. The apparatus of claim 1, further comprising:
  a press control operatively communicating with the press actuator, the press control controlling operation of the press actuator to selectively extend the press rod from the press housing and retract the press rod into the press housing; and,
  a remove control operatively communicating with the remove actuator, the remove control controlling operation of the remove actuator to selectively extend the remove rod from the remove housing and retract the remove rod into the remove housing.

6. The apparatus of claim 5, further comprising:
  the press control being a manually operated control; and, the remove control being a manually operated control.

7. The apparatus of claim 5, further comprising:
  the press control being a pneumatic control; and,
  the remove control being a pneumatic control.

8. The apparatus of claim 1, further comprising:
  the press actuator being a first press actuator, the first press actuator having a first press housing with a first press rod extending from inside the first press housing to a distal end of the first press rod outside the first press housing;
  a second press actuator, the second press actuator having a second press housing with a second press rod extending from inside the second press housing to a distal end of the second press rod outside the second press housing;
  the check pin holder being operatively connected to the distal end of the first press rod and to the distal end of the second press rod;

the remove actuator being a first remove actuator, the first remove actuator having a first remove housing with a first remove rod extending from inside the first remove housing to a distal end of the first remove rod outside the first remove housing; and, a second remove actuator, the second remove actuator having a second remove housing with a second remove rod extending from inside the second remove housing to a distal end of the second remove rod outside the second remove housing.

9. The apparatus of claim 8, further comprising:
a base;
the first press actuator being secured to the base;
the second press actuator being secured to the base;
the first remove actuator being secured to the base; and,
the second remove actuator being secured to the base.

10. The apparatus of claim 9, further comprising:
the first press actuator, the second press actuator, the first remove actuator and the second remove actuator being secured to the base in parallel orientations.

11. The apparatus of claim 9, further comprising:
the first press actuator and the second press actuator being positioned in a press plane;
the first remove actuator and the second remove actuator being positioned in a remove plane; and,
the press plane and the remove plane intersect and are perpendicular.

12. A check pin insertion and removal apparatus comprising:
a first press actuator, the first press actuator having a first press housing with a first press rod extending from inside the first press housing to a distal end of the first press rod outside the first press housing, the first press rod being movable linearly between an extended position of the first press rod relative to the first press housing and a retracted position of the first press rod relative to the first press housing;
a second press actuator, the second press actuator having a second press housing with a second press rod extending from inside the second press housing to a distal end of the second press rod outside the second press housing, the second press rod being moveable linearly between an extended position of the second press rod relative to the second press housing and a retracted position of the second press rod relative to the second press housing;
a check pin holder operatively connected to the distal end of the first press rod and operatively connected to the distal end of the second press rod, the check pin holder being operable to removably hold a check pin on the check pin holder;
the first press actuator and the second press actuator being operable together to selectively move the first press rod to the extended position of the first press rod relative to the first press housing and move the second press rod to the extended position of the second press rod relative to the second press housing and move a check pin held by the check pin holder into a hole in a workpiece surface; and,
the first press actuator and the second press actuator being operable together to selectively move the first press rod to the retracted position of the first press rod relative to the first press housing and move the second press rod to the retracted position of the second press rod relative to the second press housing.

13. The apparatus of claim 12, further comprising:
a first remove actuator, the first remove actuator having a first remove housing with a first remove rod extending from inside the first remove housing to a distal end of the first remove rod outside the first remove housing, the first remove rod being moveable linearly between an extended position of the first remove rod relative to the first remove housing and a retracted position of the first remove rod relative to the first remove housing;
a second remove actuator, the second remove actuator having a second remove housing with a second remove rod extending from inside the second remove housing to a distal end of the second remove rod outside the second remove housing, the second remove rod being moveable linearly between an extended position of the second remove rod relative to the second remove housing and a retracted position of the second remove rod relative to the second remove housing;
the first remove actuator and the second remove actuator being operable together to selectively move the first remove rod to the extended position of the first remove rod relative to the first remove housing and move the second remove rod to the extended position of the second remove rod relative to the second remove housing and move the distal end of the first remove rod and the distal end of the second remove rod into operative engagement with the workpiece surface and push against the workpiece surface to move the first remove housing and the second remove housing away from the workpiece surface and remove the check pin from the hole in the workpiece surface; and, the first remove actuator and the second remove actuator being operable together to selectively move the first remove rod to the retracted position of the first remove rod relative to the first remove housing and move the second remove rod to the retracted position of the second remove rod relative to the second remove housing.

14. The apparatus of claim 13, further comprising:
the first press actuator being operable to selectively extend the first press rod from the first press housing and retract the first press rod into the first press housing along a first press axis;
the second press actuator being operable to selectively extend the second press rod from the second press housing and retract the second press rod into the second press housing along a second press axis;
the first remove actuator being operable to selectively extend the first remove rod from the first remove housing and retract the first remove rod into the first remove housing along a first remove axis;
the second remove actuator being operable to selectively extend the second remove rod from the second remove housing and retract the second remove rod into the second remove housing along a second remove axis; and,
the first press axis, the second press axis, the first remove axis and the second remove axis being parallel.

15. The apparatus of claim 13, further comprising:
the first press housing being a cylindrical housing; a first press piston inside the first press housing;
the first press rod having a proximal end connected to the first press piston and the first press rod extending from the proximal end of the first press rod connected to the first press piston to the distal end of the first press rod outside the first press housing;

the second press housing being a cylindrical housing;
a second press piston inside the second press housing;
the second press rod having a proximal end connected to the second press piston and the second press rod extending from the proximal end of the second press rod connected to the second press piston to the distal end of the second press rod outside the second press housing; the first remove housing being a cylindrical housing; a first remove piston inside the first remove housing;
the first remove rod having a proximal end connected to the first remove piston and the first remove rod extending from the proximal end of the first remove rod connected to the first remove piston to the distal end of the first remove rod outside the first remove housing;
the second remove housing being a cylindrical housing;
a second remove piston inside the second remove housing; and,
the second remove rod having a proximal end connected to the second remove piston and the second remove rod extending from the proximal end of the second remove rod connected to the second remove piston to the distal end of the second remove rod outside the second remove housing.

16. The apparatus of claim 13, further comprising:
a base;
the first press actuator being secured to the base; the second press actuator being secured to the base;
the first remove actuator being secured to the base; and, the second remove actuator being secured to the base.

17. The apparatus of claim 16, further comprising:
the first press actuator, the second press actuator, the first remove actuator and the second remove actuator being secured to the base in parallel orientations.

18. The apparatus of claim 16, further comprising:
the first press actuator and the second press actuator being positioned in a press plane;
the first remove actuator and the second remove actuator being positioned in a remove plane; and,
the press plane and remove plane intersect and are perpendicular.

19. A method of inserting a check pin into a hole in a workpiece surface and removing the check pin from the hole in the workpiece surface, the method comprising:
operating a press actuator having a press housing with a press rod extending from inside of the press housing to a distal end of the press rod outside the press housing;
operatively connecting a check pin holder to the distal end of the press rod, the check pin holder being operable to removably attach a check pin on the check pin holder;
operating the press actuator to selectively extend the press rod from the press housing and move a check pin held by the check pin holder into a hole in a work piece surface, and retract the press rod into the press housing;
operating a remove actuator having a remove housing with a remove rod extending from inside the remove housing to a distal end of the remove rod outside the remove housing; and
operating the remove actuator to selectively extend the remove rod from the remove housing and move the distal end of the remove rod into operative engagement with the workpiece surface and push against the workpiece surface to move the remove housing away from the workpiece surface and remove the check pin held by the check pin holder from the hole in the workpiece surface, and retract the remove rod into the remove housing.

20. The method of claim 19, further comprising:
operating the press actuator to selectively extend the press rod from the press housing and retract the press rod into the press housing along a press axis; and
operating the remove actuator to selectively extend the remove rod from the remove housing and retract the remove rod into the remove housing along a remove axis, the press axis and the remove axis being parallel.

21. A check pin insertion and removal system, comprising:
a base;
a check pin holder;
a first press actuator and a second press actuator on the base, the first press actuator and the second press actuator each having a press housing and a press rod with a distal end coupled to a yoke configured to engage the check pin holder, and the first press actuator and the second press actuator each being operable to selectively extend the press rods and move a check pin held by the check pin holder into a tapered hole in a workpiece surface;
a first remove actuator and a second remove actuator on the base, the first remove actuator and the second remove actuator each having a remove housing and a remove rod with a distal end coupled to a remove pad, the first remove actuator and the second remove actuator each being operable to selectively extend the remove rods to move the remove pads to engage and push against the workpiece surface, to move the base away from the workpiece surface and cause the removal of the check pin from the tapered hole; and,
a control operatively communicating with the first press actuator and the second press actuator and with the first remove actuator and the second remove actuator, the control being configured for controlling operation of the first press actuator and the second press actuator to selectively extend the press rods and move the check pin held by the check pin holder into a tapered hole, and for controlling operation of the first remove actuator and the second remove actuator to selectively extend the remove pads to engage and push against the workpiece surface and cause removal of the check pin from the tapered hole.

* * * * *